(12) United States Patent
Shooter, II

(10) Patent No.: US 7,975,424 B1
(45) Date of Patent: Jul. 12, 2011

(54) CASTABLE FRAMED FISH CATCHING NET

(76) Inventor: John Francis Shooter, II, Lubbock, TX (US)

(*) Notice: Subject to any disclaimer, the term of this patent is extended or adjusted under 35 U.S.C. 154(b) by 384 days.

(21) Appl. No.: 12/378,038

(22) Filed: Feb. 9, 2009

(51) Int. Cl.
- *A01K 69/00* (2006.01)
- *A01K 69/02* (2006.01)
- *A01K 73/00* (2006.01)

(52) U.S. Cl. .................................. 43/7; 43/8
(58) Field of Classification Search ............... 43/4, 7–14
See application file for complete search history.

(56) References Cited

U.S. PATENT DOCUMENTS

| | | | |
|---|---|---|---|
| 2,664,320 A * | 12/1953 | Fox | 403/218 |
| 3,548,531 A | 12/1970 | Holden | |
| 3,688,433 A | 9/1972 | Niskin | |
| 4,138,790 A * | 2/1979 | Schmucker | 43/12 |
| 4,653,214 A | 3/1987 | Cline | |
| 4,745,703 A | 5/1988 | Walter | |
| 4,799,725 A * | 1/1989 | Anderson | 294/19.2 |
| 4,815,227 A * | 3/1989 | Flanders, Sr. | 43/11 |
| 4,870,773 A * | 10/1989 | Schmucker et al. | 43/12 |
| 4,914,848 A | 4/1990 | Kinoshita | |
| 5,339,556 A * | 8/1994 | Boehm | 43/11 |
| 5,561,936 A | 10/1996 | Franke | |
| 5,615,510 A | 4/1997 | Anderson | |
| 5,737,869 A | 4/1998 | Murguido | |
| 6,705,039 B1 | 3/2004 | Campbell | |
| 2003/0131519 A1 | 7/2003 | Fickling, Jr. | |

\* cited by examiner

*Primary Examiner* — Kimberly S Smith
*Assistant Examiner* — Danielle Clerkley

(57) ABSTRACT

One embodiment of a castable fish catching net device operable by one person for capturing aquatic animals from any body of water without the need for the operator to enter the water. Includes a purse type seine supported by a generally triangular frame which is heavier than the surrounding water thus providing a sinking force. A handle is attached to the apex of the triangular frame extending in towards the center of the frame. A casting and retrieval cord is attachable to the most center end of the handle. Buoyant means is provided to orient the fish catching net device in a substantially vertical attitude relative to the surface of the body of water as it descends into the water. The purse shaped net has membranes that generate a buoyant-force as the fish catching net device is dragged through the water thus providing the operator with the ability to control the depth of deployment by varying the speed of forward travel through the water.

18 Claims, 3 Drawing Sheets

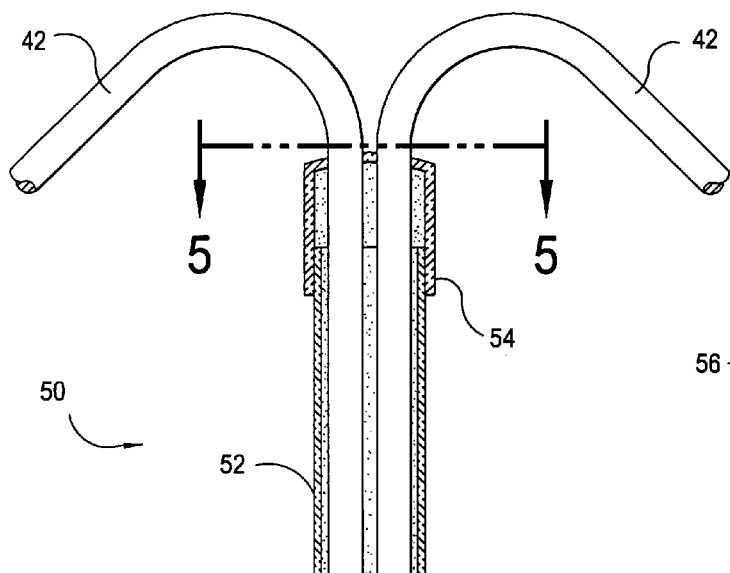
FIG 3
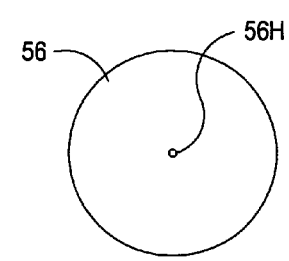
FIG 4
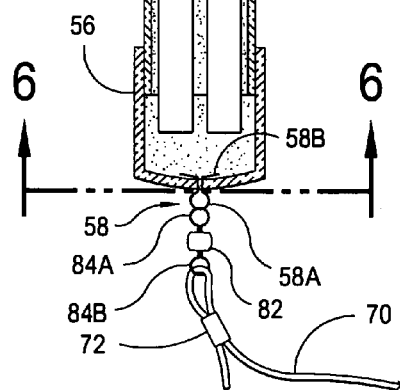
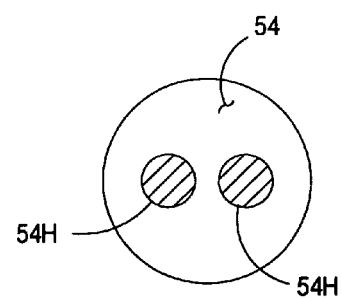
FIG 5

CASTABLE FRAMED FISH CATCHING NET

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This application generally relates to fish catching nets, specifically to the type that can be cast away and retrieved by one person and can also be towed behind watercraft for trawling.

2. Prior Art

Nets have been used to capture aquatic animals since prehistoric times. Trawl nets are deployed from watercraft. Seine nets are used from the shore. The oldest nets are rectangular sheets of mesh. To be useful from the shore, two people must wade into the water with the ends of the net attached to poles that are used as handles and to keep the net upright. Together, they drag themselves and the net through the water hoping they don't scare away what they are attempting to catch. This type of seine is only useful with two operators and is limited to areas of gentle slope less than waist deep. This type of net predates written history.

The prior art exemplified by U.S. Pat. No. 4,653,214 to Cline (1987 Mar. 31) reveals a seine that is pushed through the water. It provides a cumbersome and heavy frame with an attached elongated handle. It requires flotation devices to help overcome its weight and size. It must be assembled and disassembled before and after each use. The operator must enter the water while holding it in position and attempt to push it through the water. Due to its large size, it could not be used in moving water such as streams or rivers. No commercial success was ever achieved with this design.

A cast type net has been used for millennia throughout the world. It dates back at least to ancient Egypt. It consists of a circular planar or conical mesh net which has weights affixed around the perimeter. Drawstrings are attached to the underside from multiple points of the perimeter. The strings join together at a center hole through which they pass and are attached to a retrieval line. The operator must fold the net such that the strings, weights, net, and retrieval line do not tangle. The user attempts to put enough spin on the net as it is thrown so that the weights spread the net flat before it lands on the surface of the water.

With a perfect throw, the net lands about three meters away and sinks directly towards the bottom. The weights sink faster than the net and converge to close the net. An effort to slow the premature closing of this type of net was offered in patent application publication US 2003/0131519 A1 (2001 Jul. 17) by Fickling. The application shows an additional strip of material added to the perimeter.

The noise of the weights and net hitting the surface of the water is the same as throwing a large handful of rocks into the water. Any fish directly below are unlikely to stay around. When the operator drags the closed net across the bottom through mud, weeds, rocks, and sticks, it often snags and is damaged beyond repair. The time it takes to fold the net properly, throw it, retrieve it and refold it for another attempt is considerable and requires a degree of skill and physical exertion.

The convertible dip net in U.S. Pat. No. 3,548,531 to Holden (1970 Dec. 22) is an attempt to make a net that can roll along the bottom as it is pulled by multiple retrieval lines attached to a circular frame. It is limited to smooth bottom surfaces only. It can only capture bottom dwelling creatures in the trawl mode. It cannot be cast out and retrieved. It requires assembly and disassembly for the different modes of operation and transportation. No commercial success was ever achieved by this design.

The net assembly described in U.S. Pat. No. 5,737,869 to Murguido (1998 Apr. 14) is primarily for capturing crustaceans. The operator must use a bait item on a hook, cast the net into the water and passively wait. The hope is that the crustaceans will enter the net and stay long enough so that when the net is retrieved they will not escape. It is not designed as a seine for capturing fish in that the net is deployed vertical in the water.

An rigid net anchored to the bottom of a stream bed is the subject of U.S. Pat. No. 5,615,510 to Anderson (1997 Apr. 1). To attempt to capture minnows, the operator must enter the stream and secure the unit to the bottom. The operator then moves upstream and tries to chase any bait items into the net. The operator then must travel in the water back to the unit and reach down into the water to retrieve it. Wading through swift current over rocks, submerged branches, mud, and plants requires a great deal of effort and can be dangerous. No commercial success was ever achieved with this design.

Another attempt at a framed net anchored to the bottom of a stream bed is the subject of U.S. Pat. No. 4,745,703 to Walter (1988 May 24). It consists of a large tripod-like frame with an attachable net. The net has both weights and floats. The user must assemble it at each location. The user must anchor the net assembly to the bottom of a body of water, move upstream and attempt to chase aquatic animals into the net. This concept is for use only in streams. No commercial success was ever achieved with this design.

Although U.S. Pat. No. 4,914,484 to Kinoshita (1990 Apr. 10) is in reference to deep sea trawl fishing for bottom dwelling fish, it is described in the interest of full disclosure. The claims of this patent are to provide the ability to raise or lower the trawl net as it is dragged near the bottom of the ocean. A solid sheet membrane is attached to the leading edge of the trawl net. A rope is attached to the free leading edge of the solid sheet so that the angle of inclination of the sheet can be increased or decreased. Floats and weights must be attached to the deflection membrane to make it effective. Other attempts of depth control are the use of solid canard wing-like deflectors attached to the otter boards of commercial trawl nets that can be varied in the angle of inclination with respect to the direction of travel.

A number of disadvantages are apparent in the selection of seines and trawl nets that are commercially available. Most seines require two people who are willing to enter the water. This is difficult and dangerous. The noise and disturbance is great enough to scare most bait items and fish away. These nets are only useful in water less than waist deep. The nets that are castable are difficult to use. They require a level of skill and physical effort to be of any use. They are very limited in the distance that they can be thrown. They can only be deployed in water deep enough to allow the net to close as it descends into the water. The actual volume of water that is seined through is minimal due to the rapid closing of the net once it hit the surface. The noise they make when they hit the surface of the water scares minnows to shallow water where they are less likely to be eaten by larger predators. These nets cannot be deployed in shallow water where most bait items stay. Dragging these nets across the bottom of the lake or stream often destroys the net due to abrasion and snagging.

In view of the forgoing, there is a need for a net that a single person can operate without entering the water. Additionally, this net should also be able to be towed for trawling without having to be converted from its original form. This net should be able to capture aquatic animals from different depths and distances at the choice of the operator. It should be useful in deep or shallow water. It should be able to be deployed from shore, pier, or watercraft. It should be easy enough to deploy so that even children can make use of it. It should not require any preparation for use. It should not require any special physical effort or skill.

SUMMARY

The advantages of the first embodiment of the subject of this application are that it provides a fish catching net that is operable by one person without the need to enter the water, and needs no preparation or assembly to make use of. A further advantage is that it can be cast and retrieved, and towed for trawling in its original form. Another advantage is that the net assembly provides the ability to capture all forms of aquatic animals from different depths and distances. Additionally, the net assembly can exploit the survival instinct in prey which move toward shallow water when frightened in an attempt to avoid being eaten by larger predators. A further advantage is that the net assembly has a handle integral within the net assembly with which the user may conveniently hold the net assembly in order to remove whatever has been captured. The net assembly may be constructed of inexpensive materials which are readily available and manufactured without the necessity of extensive tooling and labor.

The first embodiment of the structure of a fish catching net comprises a generally triangular frame with a handle projecting inward from the apex of the triangular shape towards a center position of the frame. The frame may be formed from a round rod of rigid material or tubing. A casting and retrieval cord is attachable to the most center end of the handle. The netting may be attached to the frame by inserting the frame rod into a channel in the netting. This channel may be formed by folding the leading edge of the netting over and mating the edge to the body of the netting thus forming the tubular channel. This channel may be slid over the frame thus defining the intake opening of the net. The purse shape of the attached net may be formed such that the upper back portion of the net is at an incline. This inclination provides a buoyant-force to cause the net assembly to rise if the forward rate of movement through the water is increased. This buoyant-force is produced by the deflecting resistance of the water against the inclined net membrane. The weight of the frame will cause the net assembly to descend into deeper water with a slower rate of forward movement. This feature will be useful in both seining and trawling modes of operation. While this description is in conjunction with a specific embodiment thereof, accordingly, it should be understood that it is illustrative and not limiting.

For use as a seine, the operator may tether the unattached end of the casting and retrieval cord to a wrist, beltloop, pole, casting rod and reel, or any other suitable item. The net assembly is thrown into the water out to whatever distance is desired. Enough air is captured in the handle tube to provide the amount of buoyancy needed to keep the frame in a vertical position as the net descends into the water.

The net is retrieved by pulling the cord at different rates of speed. To capture aquatic animals at the surface of the water, a faster rate of retrieval is used. To capture aquatic animals at intermediate depths, variable rates of retrieval are used. To capture bottom dwellers, the net assembly is allowed to descend fully and a slower retrieval rate is employed.

For trawling, the unattached end of the cord is tethered to a suitable location on the aft portion of the watercraft. As the vehicle moves forward, the net assembly trails behind at whatever depth the operator chooses by varying the rate of forward travel. The size of the net assembly is such that it is legal to use it in this manner in most states on inland waterways and coastal regions. It can be used to capture any form of aquatic animal be it minnows, baitfish, shrimp, crustaceans and fish.

The net assembly may be used in a passive manner in streams and rivers by tethering the unattached end of the retrieval cord to a suitable anchor point, such as an overhanging branch, or a pole extending over the water, such that the net is deployed into the current. Aquatic animals may be trapped in the net by the force of the moving water through the net until retrieved by the operator.

Thus, several advantages of one or more aspects are to provide a more convenient fish catching net. Other advantages of one or more aspects are to provide a more functional and useful fish catching net. These and other advantages of one or more aspects will become apparent from a consideration of the ensuing description and accompanying drawings, wherein detailed description is for the purpose of fully disclosing embodiments of a castable framed fish catching net without placing limitations thereon. While only one embodiment has thus been described, it is to be understood that other embodiments and variations may be made within the scope of the appended claims.

DRAWINGS

Figures

FIG. 3 is a frontal view in detail of the handle and cord attachment of the fish catching net device illustrated in FIG. 1.

FIG. 4 is a bottom view of the lower end cap of the handle illustrated in FIG. 3.

FIG. 5 is a top view of the upper end cap of the handle illustrated in FIG. 3.

REFERENCE NUMERALS

| | | | |
|---|---|---|---|
| 10 | first embodiment of a fish catching net assembly | | |
| 40 | generally triangular frame | 50 | handle |
| 60 | mesh netting | 70 | casting and retrieval cord |
| 42 | parallel handle supports | 52 | handle tube |
| 54 | upper end cap | 56 | lower end cap |
| 56H | hole in lower end cap | 58 | cotter pin |
| 58A | cotter pin loop | 58B | cotter pin tangs |
| 62 | upper seam of mesh net | 64 | bottom of mesh net |
| 66L | left side of mesh net | 66R | right side of mesh net |
| 72 | crimp fastener | 82 | barrel swivel |
| 84A | upper eyelet | 84B | lower eyelet |

DETAILED DESCRIPTION

First Embodiment

FIGS. 1, 2, 3, 4, and 5

Figure 1:
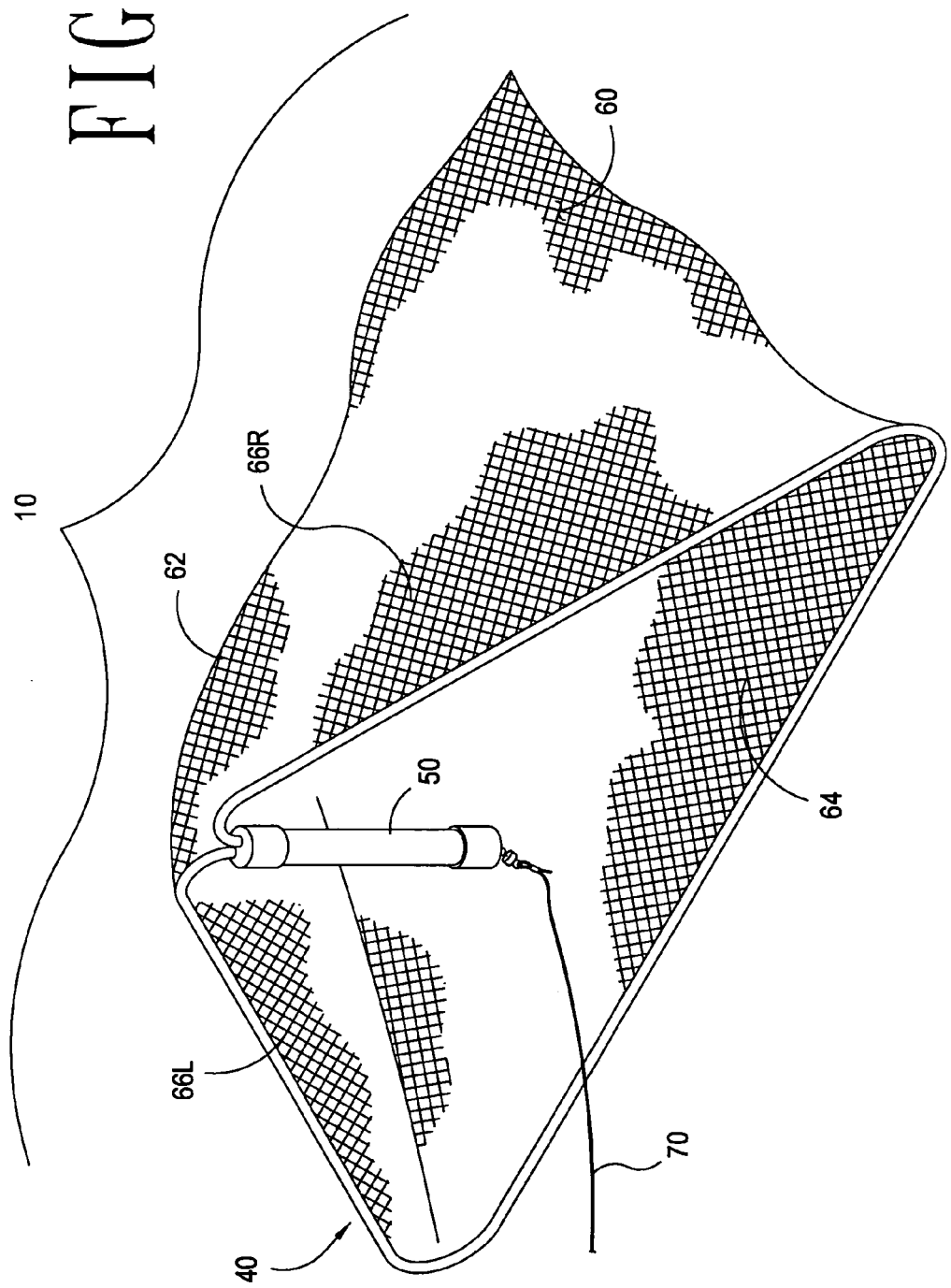
FIG. 1 is a perspective view of a fish catching net device in accordance with the first embodiment.

FIG. 1 shows a perspective view of a first embodiment of a fish catching net assembly generally referred to with numeral 10. Net assembly 10 comprises a frame 40 that supports a mesh net 60, and a tubular handle 50 to which is attached a casting and retrieval cord 70. Frame 40 is formed of a single elongated structural member, generally shaped into a triangle. However it can be formed into different shapes, such as oval, circular, rectangular, or square. I contemplate that the structural member that forms frame 40 of this embodiment be made of a round aluminum rod that is 8 mm in diameter and 180 cm long, but other thicknesses and lengths are also suitable. Other materials such as copper, plastic, fiberglass etc., as well as hollow round, square, or rectangular tubing would also be suitable. A pair of parallel handle supports 42 are formed as the ends of the structural member are further shaped so that they project inward from the apex of the triangle toward a center point of frame 40.

In the first embodiment of net assembly 10, I anticipate frame 40 to be of a right triangular shape with a hypotenuse being 60 centimeters in length. I contemplate each right angled side of this triangle to be 50 centimeters in length. In practice, frame 40 may be fabricated as large as desired and be of other geometric shapes and still be within the scope of other embodiments that are possible.

Figure 2:
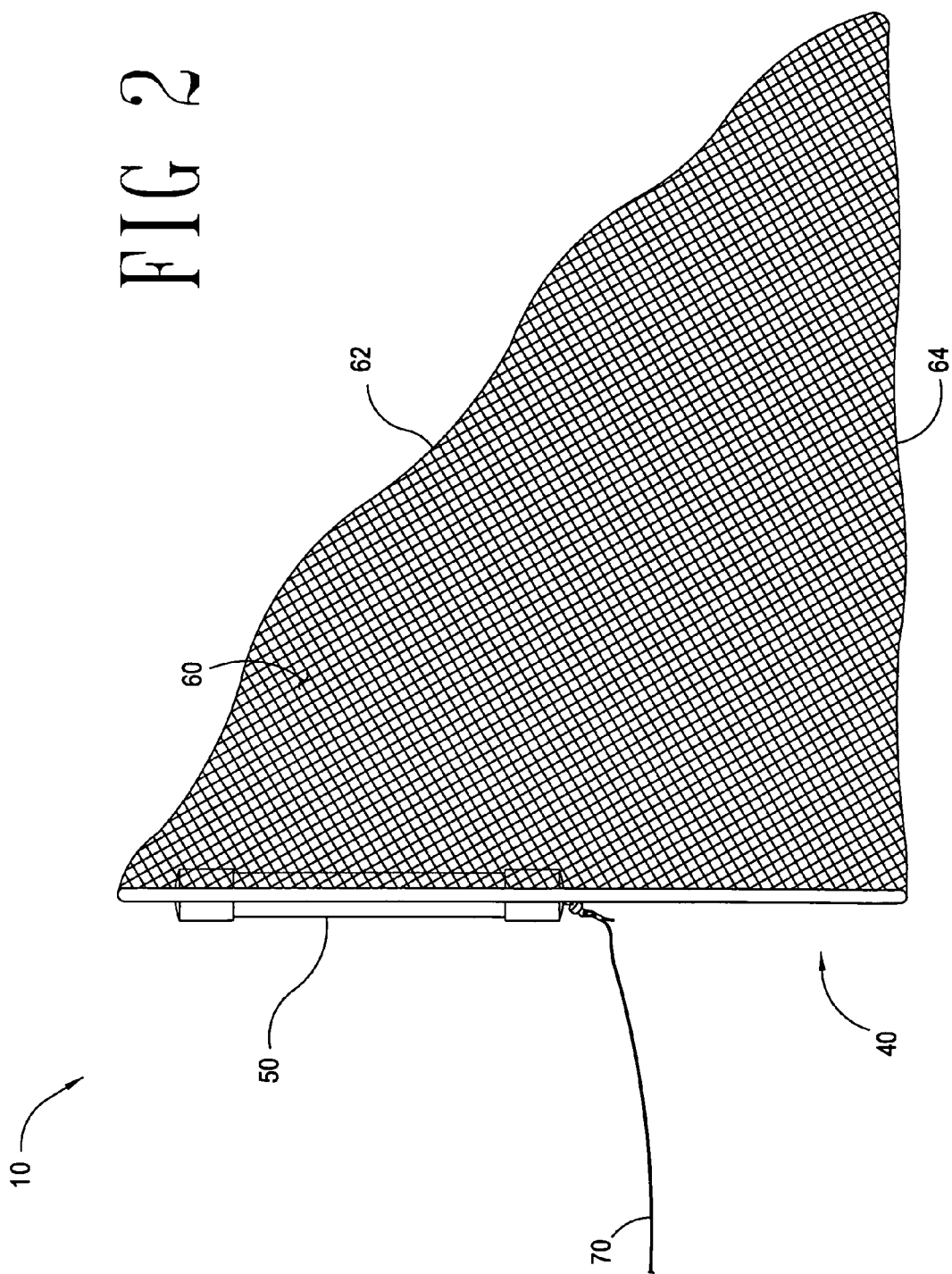
FIG. 2 is a side elevational view the fish catching net device illustrated in FIG. 1.

Referring to FIG. 1, mesh net 60 is illustrated as a generally converging purse shape adapted to be fitted around and attached to frame 40 at its front end and converging to a more narrow pocket at its rear end. Mesh net 60 may consist of mesh netting, string netting, loosely woven fabric, or other suitable material. Mesh net 60 can be cut and sewn from one piece of material and stitched such that it forms a bottom 64 and two sides 66L and 66R. The elongated member that forms frame 40 supports mesh net 60. The generally triangular shape of frame 40 defines the opening of the purse shape. The uppermost edges of sides 66L and 66R are mated together to form an upper seam 62. Referring to FIG. 2, the angle of elevation in the vertical direction of seam 62 is an incline from the apex of frame 40 downward toward the rear of bottom 64. I contemplate that mesh net 60 be made of knotless nylon netting with a mesh size of 5 mm although other materials and mesh sizes would also be suitable.

Referring to FIG. 5, an upper end cap 54 has two holes bored into its uppermost surface such that it will receive handle supports 42 through these holes. FIG. 3 shows that cap 54 is slid to the uppermost points of handle supports 42. I contemplate that cap 54 is adhered to handle supports 42 with marine epoxy adhesive although other types of adhesives would also be suitable. A handle tube 52 is coupled to cap 54 encasing handle supports 42 within itself. FIG. 4 shows a lower end cap 56 having a hole 56H bored into the centermost position of its bottom-most surface. FIG. 3 shows a cotter pin 58 consisting of a loop 58A and tangs 58B. A barrel swivel 82 has an upper eyelet 84A and a lower eyelet 84B. Swivel 82 is attached to cotter pin 58 by spreading tangs 58B apart and sliding eyelet 84A between tangs 58B into loop 58A. The tangs 58B of cotter pin 58 are inserted into hole 56H from the outside of cap 56 and bent thus fastening cotter pin 58 securely to cap 56. Hole 56H is then sealed with epoxy, silicone, or other similar substances thus excluding water from entering into handle 50. End cap 56 is coupled to the bottom end of handle tube 52 with adhesive.

FIG. 3 also illustrates how cord 70 is tethered to eyelet 84B. By inserting cord 70 through eyelet 84B and using a crimp fastener 72 to affix the end of cord 70 to itself, cord 70 is securely attached to eyelet 84B. Although many different materials may be used for cord 70, I contemplate using a 4 mm diameter solid braid nylon rope. I contemplate cord 70 to be 10 meters in length, although any length desired will be useful depending on personal preference.

Operation—FIGS. 1 and 2

In preparation for using net assembly 10 in a seining operation, a fisherman fastens the unattached end of cord 70 to a desired anchor point be it a wrist, belt loop, or other suitable location. Grasping the apex of frame 40, the user tosses net assembly 10 out over a body of water to whatever distance is chosen. Upon landing on the surface of the water, net assembly 10 will begin to descend. The amount of air captured within handle 50 will keep net assembly 10 substantially vertical while it is submerged in the water. As tension is applied to cord 70, frame 40 will orient itself into a substantially perpendicular attitude relative to cord 70. This is a result of the central location of the attachment point of cord 70 to handle 50, and the resistance against mesh net 60 by the water as net assembly 10 is pulled forward. The weight of frame 40 will cause net assembly 10 to descend deeper into the water if no forward movement is produced. The user can retrieve net assembly 10 by pulling on cord 70 thus propelling it through the water back to the user.

Referring to FIG. 2 which is a side elevational view of net assembly 10, the upper edges of sides 66L and 66R of mesh net 60 are mated at seam 62. This results in an inclination of the upper portion of mesh net 60 descending from the apex of frame 40 to the rear of bottom 64. This inclination of mesh net 60 will generate a buoyant-force as a result of the deflection of the water against this portion of net 60 as net assembly 10 moves forward. This deflective force will cause net assembly 10 to rise. The amount of buoyant-force generated is proportional to the speed with which net assembly 10 is pulled through the water. The user has the option of capturing aquatic life from any depth desired by varying the rate of retrieval of net assembly 10. If desired, the user may begin retrieving net assembly 10 immediately upon deployment. By pulling cord 70 rapidly, net assembly 10 will remain just below the surface of the body of water thereby capturing anything in its path back to the user. An intermediate depth may be seined by slowing the rate of retrieval. Bottom depths may be seined by allowing net assembly 10 to descend fully and retrieving it with an even slower rate of forward movement of through the water. Cord 70 may be attached to the end of a casting rod or long pole and net assembly 10 pulled parallel to the shoreline. Handle 50 is used for lifting and holding net assembly 10 to remove any aquatic animals that have been captured.

For trawling from watercraft, the fisherman secures the unattached end of cord 70 to a suitable anchoring point on the aft portion of the watercraft. Net assembly 10 is deployed into the water and as the watercraft moves forward, it trails behind at whatever distance is chosen by the length of cord released. The depth of deployment is determined by varying the rate of forward travel. Net assembly 10 may be retrieved, emptied of catch, and redeployed without the need to stop the watercraft.

CONCLUSION, RAMIFICATIONS, AND SCOPE

The nets used by man to capture aquatic animals have changed little in thousands of years. The efforts revealed by the prior art failed to solve the problem in a satisfactory way. All attempts diverged from each other in function. Not even combinations of designs or attempted improvements of existing devices have yielded a breakthrough in an effective device or method of capture. None have succeeded in the marketplace. To have to enter the water to catch fish and bait items is dangerous and unacceptable. No devices have been developed that utilize a new principle of operation. If this principle were in fact obvious, it would have by now resulted in a device created by any one of the billions of humans that attempt to capture aquatic animals as a food source or for sport.

Thus the reader will see that at least one embodiment of the castable framed fish catching net will provide a more reliable, convenient, yet lightweight device with which to capture aquatic animals. The first embodiment can be used successfully by persons of almost any age. Additionally, no preparation or special skills are needed. It can be cast and retrieved, and towed for trawling in its original form. It is operable by one person without the need to enter the water. It can be deployed from the shore, pier, or watercraft. One advantage is that the device can be used to capture aquatic animals from the different depths and distances that might be desired by the user. In that it can be used in deep or shallow water, it exploits the survival instinct in prey animals that tend to swim toward shallow water when frightened in an attempt to avoid being eaten by larger predators.

While the above description is considered as illustrative only of the principle of one embodiment and contains many specifities, it should not be construed as limitations on the scope, but rather as an exemplification of one preferred embodiment thereof. Therefore, it should be understood that modifications of construction methods and materials are comprehended in the spirit of the various embodiments that are possible. All suitable modifications and equivalent revisions may be made within these embodiments.

For example, with regards to the shape of frame 40, a second embodiment, not shown, of fish catching net assembly 10 is that frame 40 be of a rectangular shape. A third embodiment, not shown, of net assembly 10 is that frame 40 be of a circular shape. Additionally, frame 40 can be formed of a sealed hollow tube. Weights affixed inside or outside the tube could provide the mass needed to cause net assembly 10 to descend into the water. The air captured inside the tubing would keep net assembly 10 vertical while it is descending into the water. Further embodiments could form the purse net 60 from knotted string netting, loosely woven fabric, etc. Casting and retrieval cord 70 could be made detachable by the use of a clasp type barrel swivel. The length of cord 70 could be extended greatly for trawling at longer distances from the watercraft or reaching greater depths. Another variation possible is to provide for handle 50 to be pivotal. Handle 50 could then be rotated from inside the triangular shape to the outside converting net assembly 10 into a dip net or a fish landing net.

Accordingly, the scope should be determined not by the embodiments described and illustrated, but by the appended claims and their legal equivalents.

I claim:

1. A fish catching net device, comprising:
    (a) a generally triangular frame of predetermined size formed of an elongated structural member having first and second ends,
    (b) a tubular handle attached to and extending from the apex of said triangular frame in towards a center location of said triangular frame,
    (c) a purse shaped net of predetermined mesh size, depth of purse, angle of bottom membrane, angle of side membranes, and intake opening supported by said triangular frame,
    (d) a casting and retrieval cord attachable to the most center end of said tubular handle, said cord having a predetermined length, and
    (e) buoyant means to orient said fish catching net device in a substantially vertical attitude
        with respect to the surface of a body of water affixed to said triangular frame, the limitation—wherein said tubular handle encapsulates said first and second ends of said structural member extending from the apex of said triangular frame, said tubular handle being sealed thus trapping air inside the remaining void of said tubular handle thus providing said buoyant means to orient said fish catching net device in a substantially vertical attitude when deployed in said body of water whereby a human can cast said fish catching net device into said body of water and retrieve said fish catching net device thereby capturing aquatic animals.

2. The fish catching net device as set forth in claim 1 wherein said first and second ends of said elongated structural member are further formed to extend from the apex of said triangular frame in towards a center location of said triangular frame thus providing means to attach said tubular handle to said triangular frame.

3. The fish catching net device as set forth in claim 1 wherein said triangular frame is heavier in specific weight than said surrounding body of water in which said fish catching net device is deployed, thus giving a sinking force to said fish catching net device.

4. The fish catching net device as set forth in claim 1 further including buoyant-force generating means to cause said fish catching net device to rise as said fish catching net device is dragged through said body of water.

5. The fish catching net device as set forth in claim 4 wherein said fish catching net device has a membrane whose angle of elevation in the vertical direction is inclined such that the amount of said buoyant-force generated by the deflection of water by said membrane is proportional to the speed of forward travel through said water.

6. The fish catching net device as set forth in claim 4 wherein said membrane whose angle of elevation in the vertical direction is inclined is comprised of said predetermined angle of said side membranes of said purse shape net, said mesh size being substantially small enough to cause deflection of said surrounding water as said fish catching net device is dragged through said body of water thus generating said buoyant-force to said fish catching net device in proportion to the speed of forward travel through said body of water.

7. The fish catching net device as set forth in claim 1 wherein a barrel swivel provides means of attachment of said casting and retrieval cord to the most center end of said tubular handle.

8. A fish catching net device, comprising
    (a) a purse shaped net of predetermined mesh size, depth of purse, angle of bottom membrane, angle of side membranes, and intake opening, said net attached to a generally triangular support frame of predetermined size,
    (b) a tubular handle attached to the apex of said triangular frame extending in towards a central location of said triangular frame,
    (c) a casting and retrieval cord attachable to the most central end of said tubular handle, and
    (d) buoyant means attached to said triangular frame whereby said fish catching net device is maintained in a substantially vertical attitude in a body of water, the limitation—wherein said tubular handle is sealed thus trapping air in an interior void of said tubular handle providing buoyant means to orient said fish catching net device in a substantially vertical attitude when deployed in said body of water, whereby a human can cast and retrieve said fish catching net device into said body of water thereby capturing aquatic animals.

9. The fish catching net device as set forth in claim 8 wherein said triangular frame is heavier in specific weight than said surrounding body of water in which said fish catching net device is deployed thus giving a sinking force to said fish catching net assembly.

10. The fish catching net device as set forth in claim 8 further including buoyant-force generating means to cause said fish catching net device to rise as said fish catching net devices is dragged through said body of water.

11. The fish catching net device as set forth in claim 10 wherein said predetermined angle of said side membranes having said substantially small mesh size provides said buoyant-force generating means.

12. The fish catching net device as set forth in claim 8 wherein said casting and retrieval cord is attached to the most center end of said tubular handle with a barrel swivel.

13. A method of forming a fish catching net device, comprising:
(a) providing an elongated structural member having first and second ends, forming said structural member into a generally triangular shape with said first and second ends further formed to extend from the apex of said triangular frame in towards a central location of said frame, attaching a purse shaped net to said frame; attaching a tubular handle to said frame thus encapsulating said first and second ends, attaching a casting and retrieval cord to the most central end of said tubular handle, providing buoyant means to orient said fish catching net device substantially vertical in a body of water,
(b) casting said fish catching net device into said body of water,
(c) retrieving said fish catching net device, whereby aquatic animals can be easily captured for use as food and/or bait.

14. The method of claim 13 wherein said frame is heavier in specific weight than said body of water thus providing a sinking force to said fish catching net device.

15. The method of claim 13 wherein a membrane of said purse shaped net is inclined thus causing a downward deflection of water which generates a buoyant-force as said fish catching net device is dragged through said body of water.

16. The method of claim 13 wherein said tubular handle is sealed thus trapping a predetermined volume of air in a hollow interior of said tubular handle providing said buoyant means to orient said fish catching net device substantially vertical in said body of water.

17. The method of claim 13 wherein said casting and retrieval cord is atttachably affixed to the most central end of said tubular handle with a barrel swivel.

18. The method of claim 13 wherein said purse shaped net is nylon mesh.

\* \* \* \* \*